United States Patent

Tabur et al.

[11] Patent Number: 5,949,938
[45] Date of Patent: Sep. 7, 1999

[54] ALIGNER FOR SLENDER ELONGATE MEMBERS

[75] Inventors: Peter Tabur; Bruce C. Whitney, both of Portland; E. Boyd Osgood, Beaverton; David A. Kritler, Lake Oswego, all of Oreg.

[73] Assignee: PK Technology, Inc., Beaverton, Oreg.

[21] Appl. No.: 08/962,471

[22] Filed: Oct. 31, 1997

Related U.S. Application Data

[60] Provisional application No. 60/030,979, Nov. 15, 1996.

[51] Int. Cl.⁶ ............................................. G02B 6/38
[52] U.S. Cl. ............................................. 385/64; 385/147
[58] Field of Search ............................. 385/57, 58, 64, 385/65, 82, 97, 98, 99

[56] References Cited

U.S. PATENT DOCUMENTS

| | | | |
|---|---|---|---|
| 3,912,574 | 10/1975 | Cherin et al. | 350/96.21 |
| 4,028,162 | 6/1977 | Cherin et al. | 350/96.21 |
| 4,047,283 | 9/1977 | Kunze | 29/466 |
| 4,148,559 | 4/1979 | Gauthier | 350/96.21 |
| 4,196,032 | 4/1980 | Eggleston | 350/96.21 |
| 4,248,499 | 2/1981 | Liertz et al. | 350/96.21 |
| 4,288,143 | 9/1981 | Di Vita | 350/96.21 |
| 4,345,137 | 8/1982 | Mignien et al. | 219/121 PK |
| 4,377,323 | 3/1983 | Schneider | 350/96.21 |
| 4,416,506 | 11/1983 | Johnson et al. | 350/96.21 |
| 4,473,272 | 9/1984 | Johnson | 350/96.21 |
| 4,483,584 | 11/1984 | Gresty | 350/96.21 |
| 4,486,072 | 12/1984 | Roberts | 350/96.21 |
| 4,545,644 | 10/1985 | DeVeau, Jr. et al. | 350/96.21 |
| 4,664,732 | 5/1987 | Campbell et al. | 156/158 |
| 4,728,169 | 3/1988 | Campbell et al. | 350/96.15 |
| 4,787,704 | 11/1988 | Knecht et al. | 350/96.21 |
| 4,790,617 | 12/1988 | Campbell et al. | 350/96.15 |
| 5,481,632 | 1/1996 | Hirai et al. | 385/49 |
| 5,497,439 | 3/1996 | Piffaretti et al. | 385/89 |

FOREIGN PATENT DOCUMENTS 1 447 317   8/1976   United Kingdom .

OTHER PUBLICATIONS

Fiber Optics Handbook for Engineers and Scientists, Frederick C. Allard, Ed., McGraw–Hill Publishing Company, 1989, pp. 3.14–3.21.

*Primary Examiner*—Hung N. Ngo
*Attorney, Agent, or Firm*—Smith-Hill and Bedell

[57] ABSTRACT

An optical fiber aligner includes an alignment block formed with an alignment channel and two rods fitted in the alignment channel. The rods are held in spaced apart relationship in the alignment channel whereby an open bottom groove is formed between the rods for receiving the ends of two optical fibers to be aligned. The space between the rods is sufficiently wide to allow dirt and debris from the fibers to pass between the rods but not so wide as to allow the fibers to pass between the rods.

18 Claims, 8 Drawing Sheets

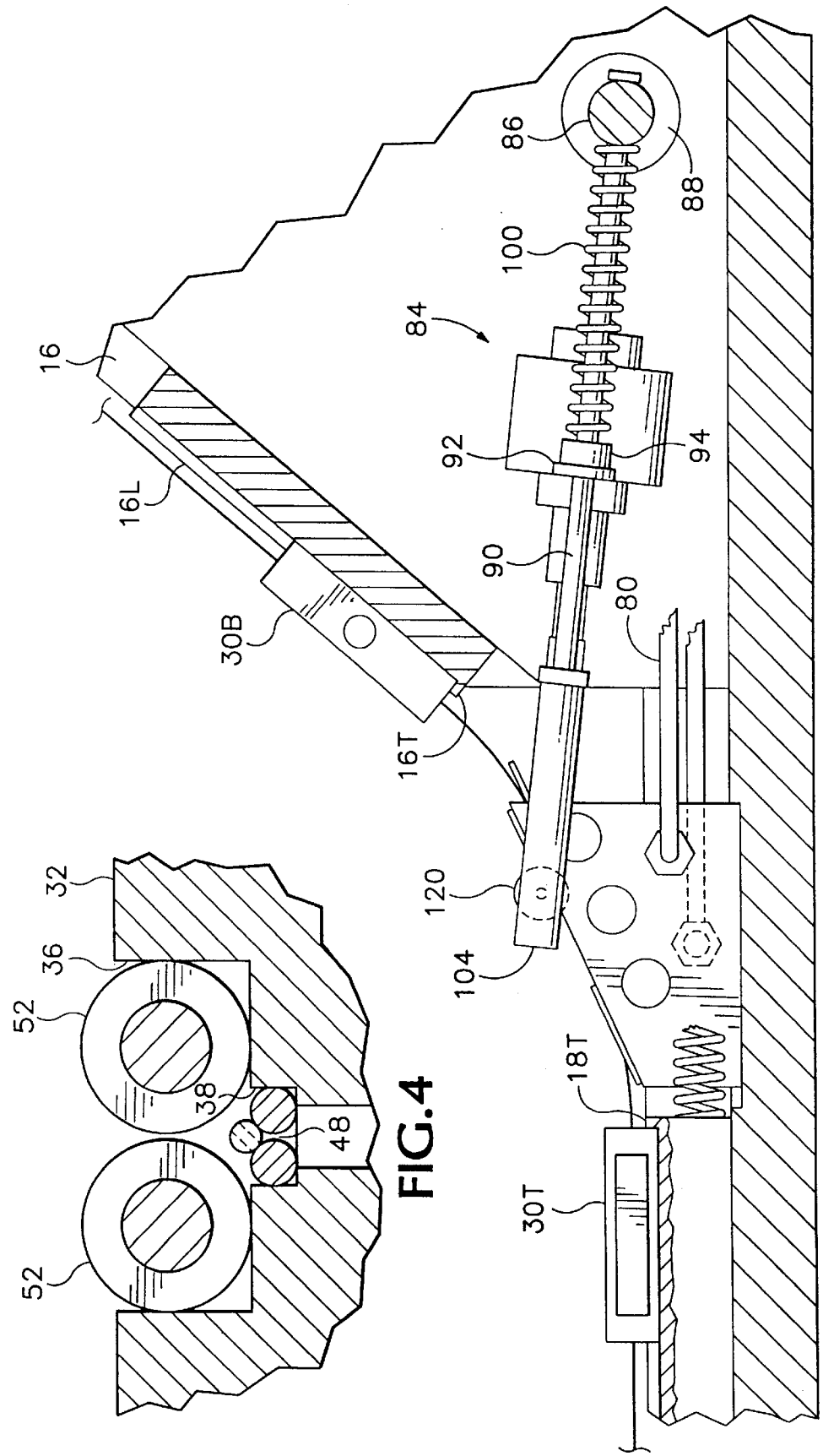

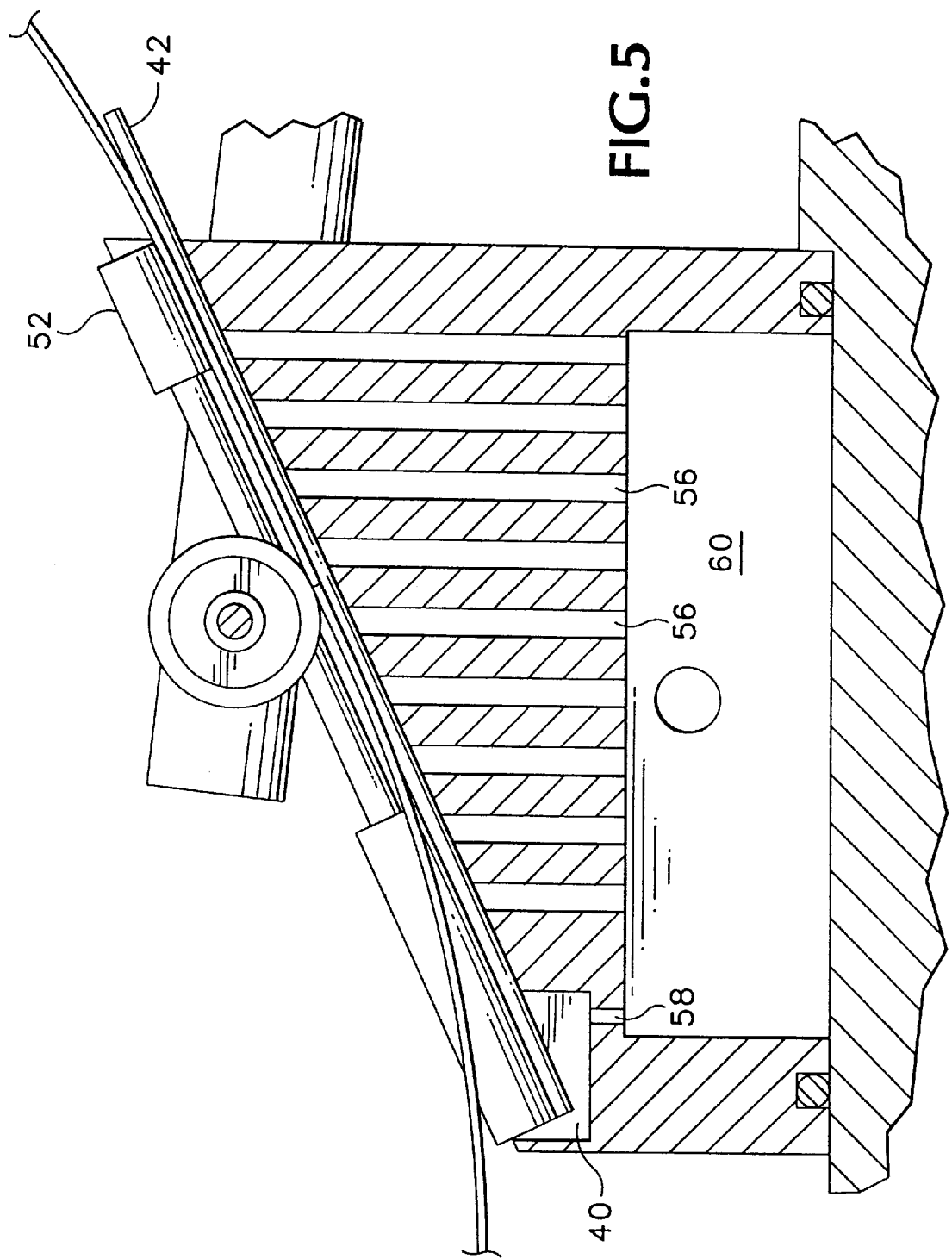

ALIGNER FOR SLENDER ELONGATE MEMBERS

CROSS-REFERENCE TO PROVISIONAL APPLICATION

This application claims benefit of Provisional Application No. 60/030,979 filed Nov. 15, 1996.

BACKGROUND OF THE INVENTION

This invention relates to an aligner for slender elongate members.

In making measurements on an optical fiber it may be necessary to couple the fiber under test (the "test fiber") to an optical fiber test or measurement instrument, such as an optical time domain reflectometer (OTDR). This may be done by temporarily coupling the test fiber in end-to-end relationship with a buffer fiber which remains semi-permanently connected to the test or measurement instrument. In order to couple slender elongate members, such as optical fibers, in end-to-end relationship it is necessary to bring the members into axial alignment. Various forms of fiber aligners have been proposed in the past for bringing optical fibers into axial alignment for optical coupling. Fiber aligners that are currently in use suffer from several disadvantages, such as poor alignment of the fibers and poor optical coupling due to foreign matter between the end faces of the fibers. Much of the foreign matter that normally impairs the coupling between a buffer fiber and a test fiber is introduced to the fiber alignment site by the test fiber, particularly in the form of coating debris from the preparation of the test fiber and dirt present on the test fiber. Since many test fibers are successively aligned with the buffer fiber, there is a possibility for dirt and debris to accumulate between the end faces of the test fiber and buffer fiber and adversely affect the quality of the optical coupling. Dirt and debris at the alignment site may also prevent alignment of the fibers and indirectly affect the quality of the optical coupling.

SUMMARY OF THE INVENTION

In accordance with a first aspect of the invention there is provided an aligner for bringing two slender elongate members into accurate end-to-end alignment, comprising an alignment member formed with an alignment channel, first and second rods fitted in the alignment channel, and a means for holding the rods in spaced apart relationship in the alignment channel whereby an open bottom groove is formed between the rods for receiving the elongate members, the space between the rods being sufficiently wide to allow dirt and debris from the elongate members to pass between the rods but not so wide as to allow the elongate members to pass between the rods.

In accordance with a second aspect of the invention there is provided an aligner for bringing two optical fibers into accurate end-to-end alignment, comprising a base defining a reference plane, said reference plane being horizontal when the aligner is in use, an alignment member mounted on the base and formed with an alignment channel inclined at an angle of at least about 20° relative to the reference plane for receiving respective end segments of the optical fibers, and a dispenser for dispensing index matching liquid into the channel at an uphill location of the channel so that loose matter in the channel is carried downhill with the liquid.

In accordance with a third aspect of the invention there is provided a method of testing a length of optical fiber, comprising (a) providing a fiber aligner comprising a base defining a reference plane, said reference plane being horizontal when the aligner is in use, an alignment member mounted on the base and formed with an alignment channel inclined at an angle of at least about 20° relative to the reference plane for receiving respective end segments of the optical fibers, and a dispenser for dispensing index matching liquid into the channel at an uphill location of the channel so that loose matter in the channel is carried downhill with the liquid, (b) providing an optical fiber test instrument, (c) coupling the optical fiber test instrument to one end of a buffer fiber, (d) installing the opposite end of the buffer fiber in the fiber aligner and installing one end of the length of fiber to be tested in the fiber aligner, and (e) employing the optical fiber test instrument to launch optical energy into the fiber under test by way of the buffer fiber.

BRIEF DESCRIPTION OF THE DRAWINGS

For a better understanding of the invention, and to show how the same may be carried into effect, reference will now be made, by way of example, to the accompanying drawings, in which FIG. 4 is an enlarged partial sectional view of the alignment block, FIG. 5 is a sectional view of the alignment block, taken in a plane perpendicular to the plane of the sectional view shown in FIG. 4, FIG. 6 is a partial sectional view of the fiber aligner.

DETAILED DESCRIPTION

Figure 1:
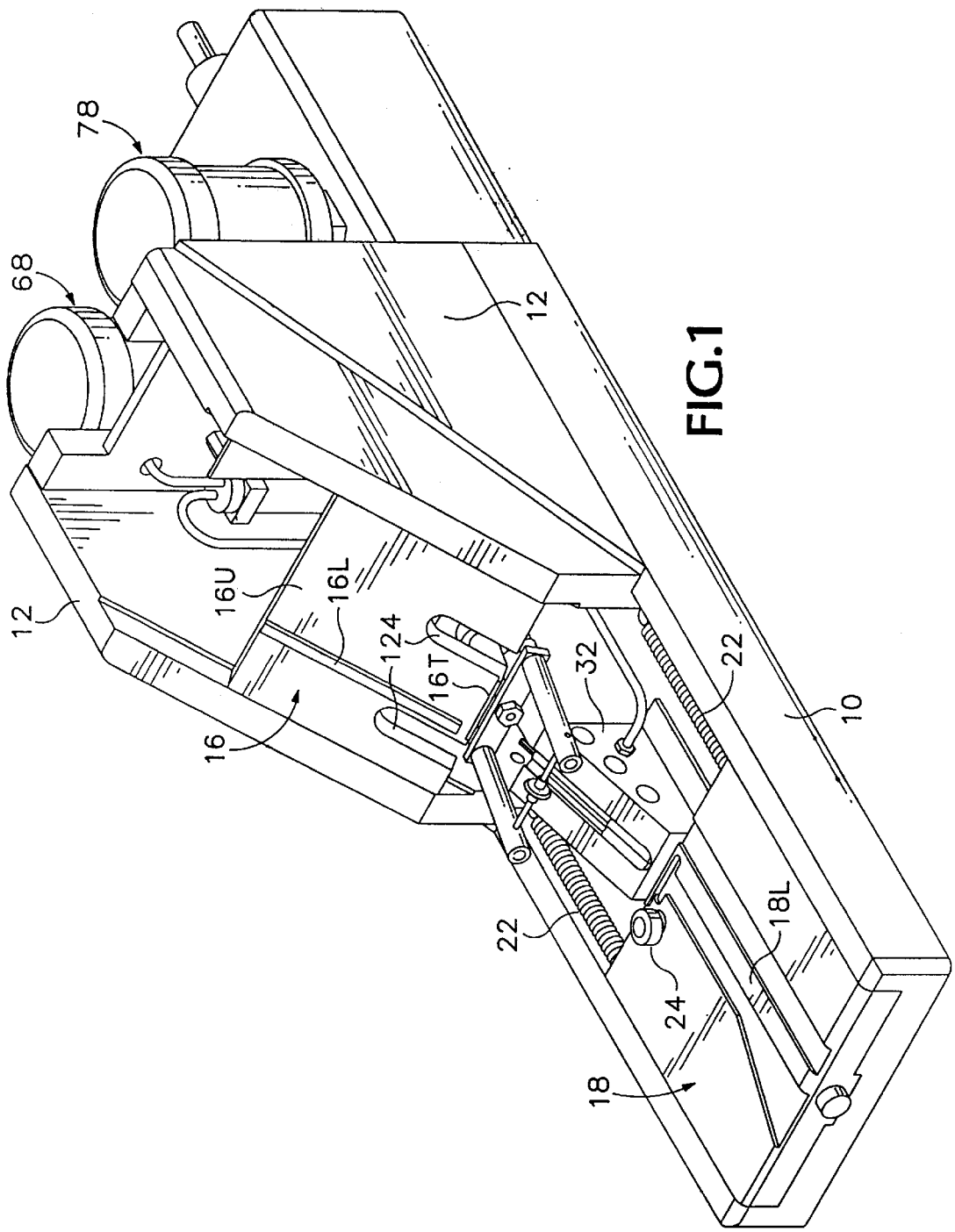
FIG. 1 is a perspective view of an optical fiber aligner in accordance with the present invention.
Figure 2:
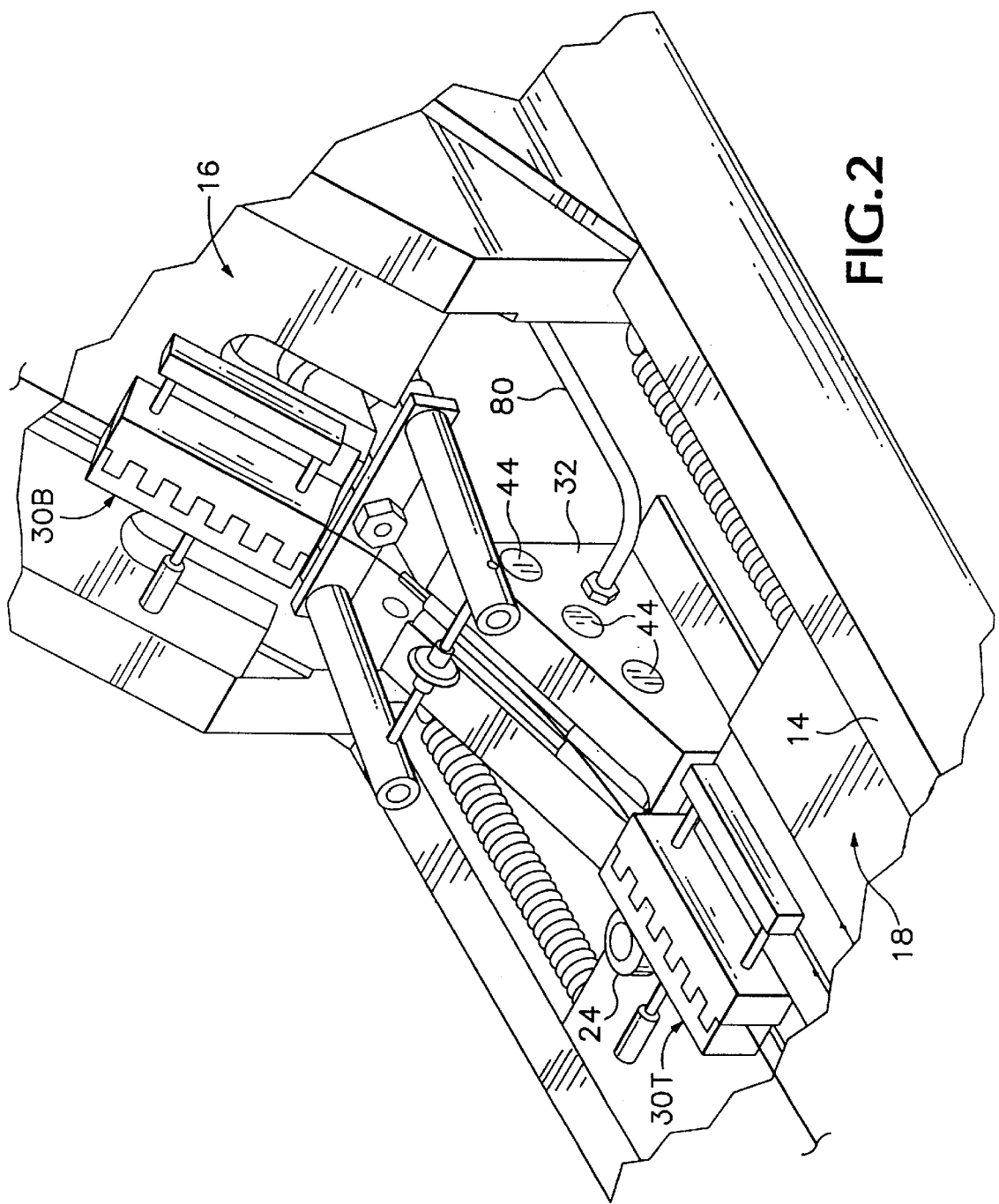
FIG. 2 is a partial perspective view of the fiber aligner to an enlarged scale.
Figure 3:
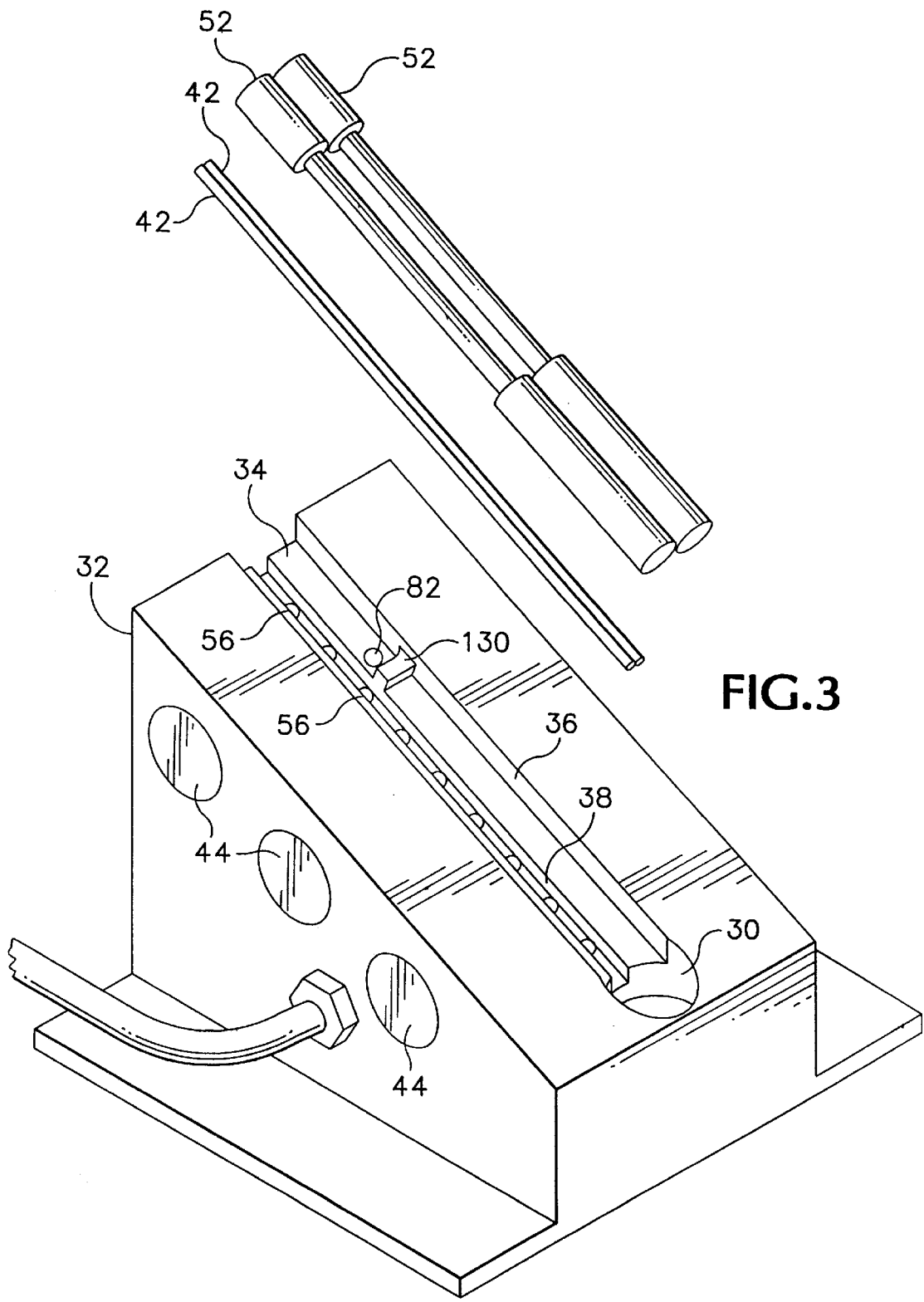
FIG. 3 is an enlarged perspective view of an alignment block forming part of the fiber aligner.

The optical fiber aligner illustrated in the drawings comprises a frame including a base plate 10 and two vertical walls 12 spaced apart across the base plate. The base plate 10 includes a horizontal guide rail 14. A buffer fiber clip stage 16 is mounted fixedly between the walls 12 and has a flat upper surface 16U inclined at about 40° to vertical, a longitudinal shoulder 16L and a transverse shoulder 16T. The longitudinal shoulder 16L is in a vertical plane parallel to the guide rail 14 and the transverse shoulder 16T is perpendicular to the longitudinal shoulder.

A test fiber clip stage 18 is movably supported on the base plate. Vertical positioning springs (not shown) urge the stage 18 upwardly into contact with stop elements (not shown) which limit upward movement of the stage. Also, horizontal positioning springs (not shown) urge the stage 18 into contact with the rail 14. Tension springs 22 pull the stage 18 into contact with a stop element (not shown) which is movable lengthwise of the guide rail 14. The combined action of the tension springs 22 and the horizontal and vertical positioning springs ensures that the flat upper surface 18U of the stage is horizontal, a longitudinal shoulder 18L is parallel to the rail 14 and a transverse shoulder 18T is at an accurately controlled position along the rail 14.

Figure 9:
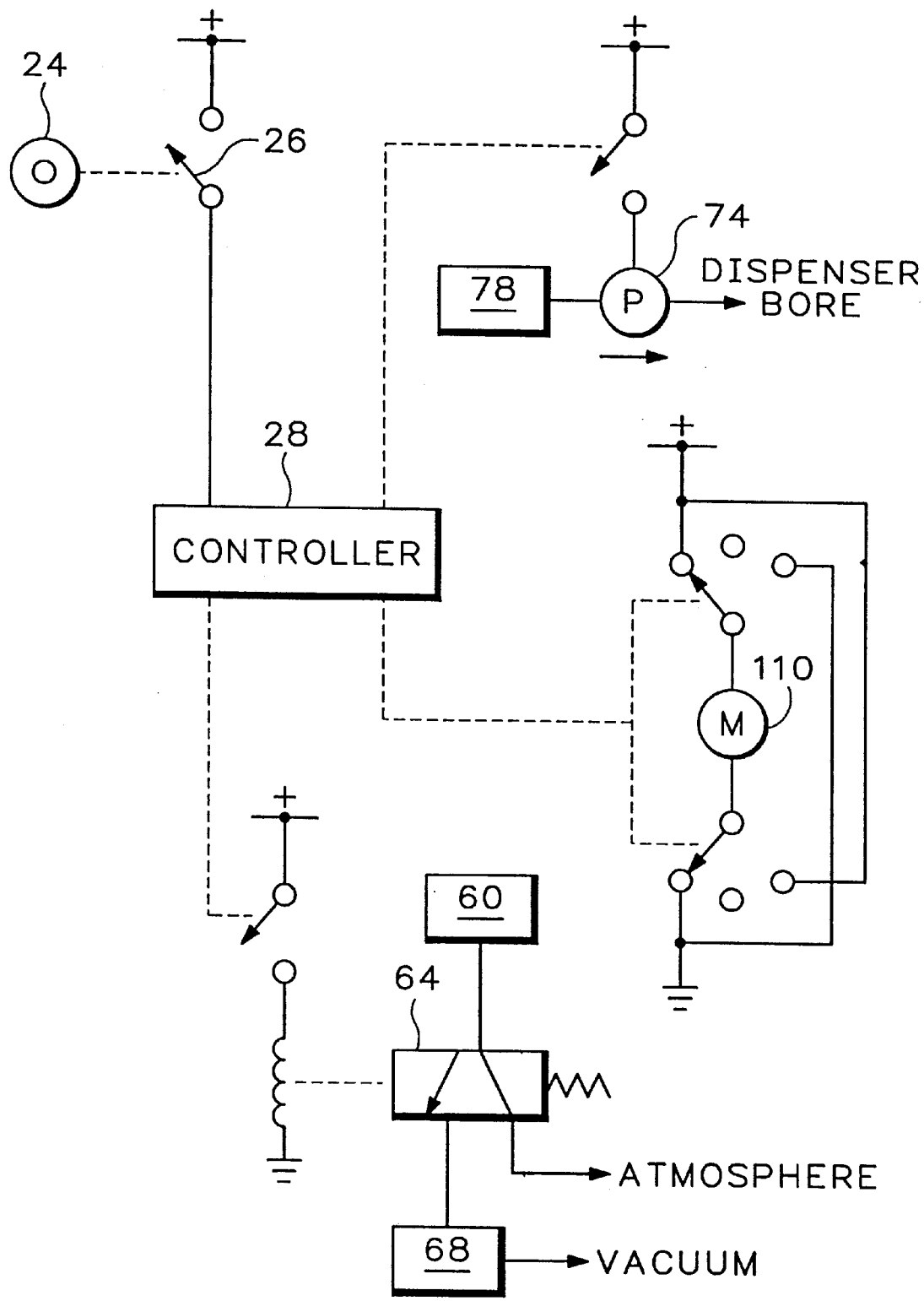
FIG. 9 is a schematic block diagram illustrating various parts of the fiber aligner.

Adjacent the transverse shoulder 18T there is an actuator contact wheel 24 which is spring biased toward the rail 14. The contact wheel controls the state of a switch 26 (FIG. 9). The state of the switch is detected by a controller 28 mounted on a circuit board (not shown) in the space between the walls 12.

The flat upper surface, longitudinal shoulder and transverse shoulder of each clip stage define an installation location for an optical fiber clip 30 on the stage. The clip is of the kind sold by Photon Kinetics, Inc. of Beaverton, Oreg. for various commercially available optical fibers and is designed for use with a fiber cleaver which cleaves a fiber held in the clip at a predetermined, accurately repeatable distance from a reference face of the clip. Each clip defines an axis on which an optical fiber segment held in the clip lies. When the clips are installed on the respective clip stages, the axes defined by the clips lie in a common vertical plane.

Between the two stages 16 and 18 is an alignment block 32. The alignment block is formed with a channel 34 in its sloping top surface. The channel 34 is compound in form, being composed of a wider channel 36 and a narrower channel 38 in the base of the wider channel, and is bisected longitudinally by the vertical lane containing the axes defined by the clips 30. At the lower end of the channel 34 is a cylindrical pocket 40. Two steel dowel pins 42 are placed in the narrow channel 38 with their lower ends projecting into the pocket 40. The width of the narrow channel 38 is somewhat greater than the combined diameters of the dowel pins 42, and the two pins are held apart by magnets 44 embedded in the walls of the alignment block 32 so that there is a small clearance between the two pins, forming an open-bottom alignment groove 48 for receiving the ends of two fibers. The magnets 44 are arranged in two sets of three: three magnets on each side of the channel 34, with each magnet of one set opposite a magnet of the other set and with the polarization of the three magnets in a set alternating along the channel. Each two magnets on opposite sides of the channel are oriented with like poles together. Each pin is attracted to the closer side of the narrow channel 38 and is repelled from the other pin. Friction between the dowel pins and the walls of the narrow channel 38 ensures that the dowel pins remain stationary relative to the alignment block 32 during normal operation of the fiber aligner. The alignment groove 48 slopes downward in the direction from the buffer fiber clip stage 16 toward the test fiber clip stage 18 and is oriented at about 65° to vertical, so that the normal to the longitudinal extent of the groove bisects the obtuse angle between the upper surface of the buffer stage and the upper surface of the test stage.

Two insertion guides 52 rest on the base of the wider channel 36, above the dowel pins 42, at opposite respective sides of the narrow channel 38. The lower ends of the insertion guides 52 project into the pocket 40. The insertion guides are shaped as dumbbells, having a medial portion of smaller diameter between two terminal portions of greater diameter. The insertion guides 52 are held apart by the magnets 44.

Bores 56 open from the base of the narrow channel 38 into a collection chamber 60 and a bore 58 opens from the cylindrical pocket 40 into the chamber 60. The collection chamber is connected to a solenoid valve 64. In one state, the solenoid valve connects the collection chamber 60 from the collection tank 68 which is maintained under partial vacuum and in another state the solenoid valve isolates the collection chamber 60 from the collection tank 68 and returns it to ambient pressure. An oil dispenser pump 74 has its suction side connected to an oil supply tank 78 and its pressure side connected through a tube 80 to a dispenser bore 82 which debouches in the base of the channel 36.

Figure 7:
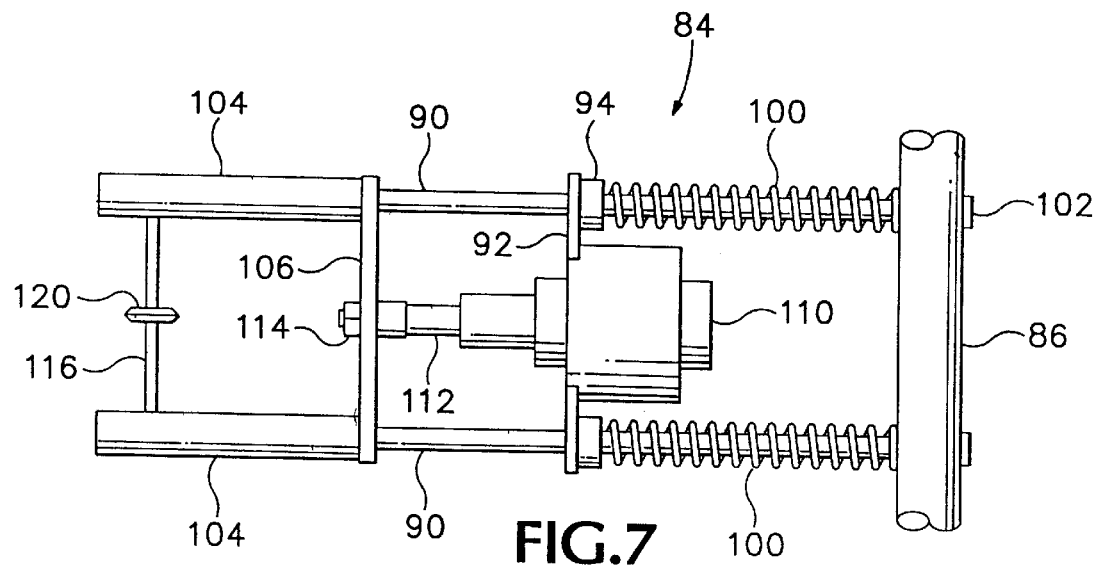
FIG. 7 is a top plan view of a stabilizing assembly forming part of the fiber aligner.
Figure 8:
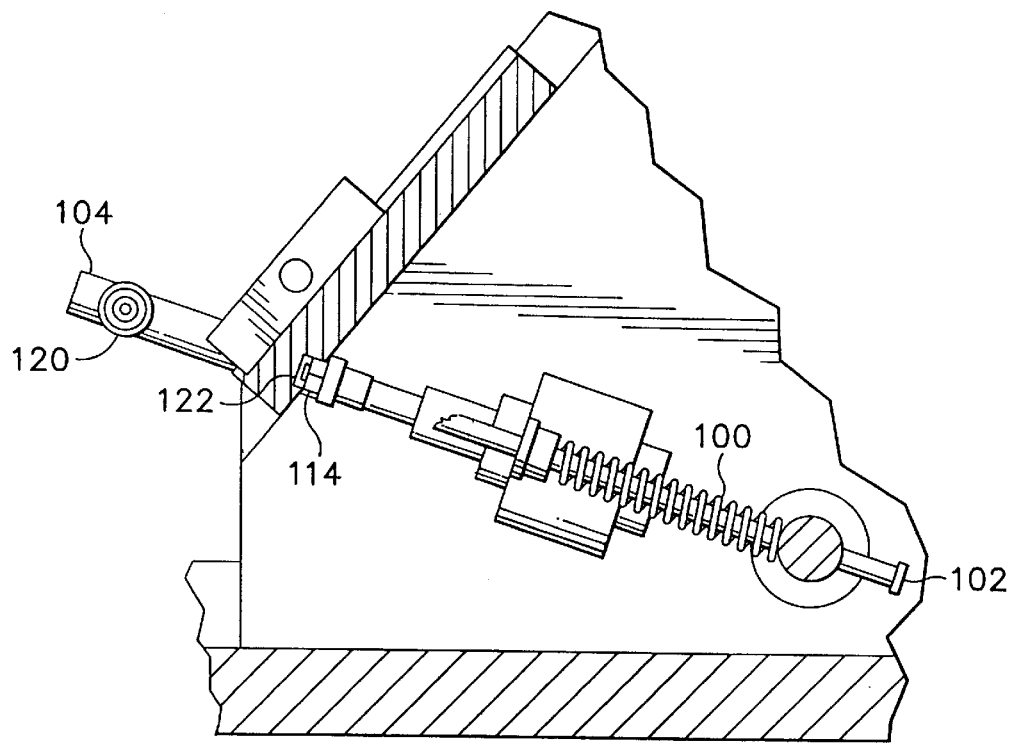
FIG. 8 is a partially broken away side view of the stabilizing assembly.

Referring to FIGS. 6–8, the optical fiber aligner also comprises a stabilizing assembly 84 including a shaft 86 which extends horizontally between the walls 12, perpendicular to the vertical plane containing the axes defined by the clips 30. This shaft is journalled in the walls 12 by bearing sleeves 88, so that it can rotate about its central axis. The shaft 86 has two parallel diametrical bores and two parallel rods 90 extend slidingly through the bores toward the alignment block 32. An actuator mounting plate 92 is provided with two bushes 94 and the two rods extend through the bushes respectively. The bushes 94 are secured against longitudinal movement with respect to the rods by set screws. The rods thread respective compression springs 100 which are captive between the shaft 86 and the bushes 94 and urge the rods 90 toward the left of FIG. 6, movement to the left being limited by an enlarged head 102 on each rod. Two sleeves 104, connected by a yoke 106, are a loose sliding fit on the ends of the rods. A motor driven linear actuator 110 has a cylindrical body which is attached to the mounting plate between the two bushes 94 and a plunger 112 which projects from the cylindrical body parallel to the mounting rods 90 and is attached to the yoke 106 by a nut 114 in threaded engagement with the plunger. An arbor pin 116 extends between the sleeves 104 and a disc 120 is rotatably fitted on the arbor pin. In the operating position of the stabilizing assembly 84, the disc 120 rests between the medial portions of the insertion guides 52 and over the groove formed by the steel dowel pins 42. Operation of the linear actuator 110 displaces the yoke 106 alternately toward and away from the mounting plate 92 in reciprocating fashion, and the disc rolls back and forth between the medial portions of the insertion guides. The seating assembly also has a stowed position, shown in FIG. 8, in which the nut 114 is received in a recess 122 on the underside of the stage 16, the sleeves 104 are received in respective slots 124 in the stage 16 and the disc 120 is clear of the alignment block 32.

In initial set-up of the fiber aligner, an operator strips coating from an end segment of the buffer fiber 70B and fits it in the buffer fiber clip 30B and cleaves the projecting end of the buffer fiber. The operator places the stabilizing assembly 84 in its stowed position and installs the buffer fiber clip on the stage 16 by placing the clip against the longitudinal shoulder 16L with the reference face of the clip toward the transverse shoulder 16T. The operator advances the buffer fiber clip along the longitudinal shoulder 16L to bring the reference face into contact with the transverse shoulder 16T. As the buffer fiber clip approaches the transverse shoulder, the leading end of the buffer fiber is guided between the insertion guides 52 into contact with the dowel pins 42 and ultimately reaches a final position such that the end of the buffer fiber is in contact with the dowel pins and is in the alignment groove 48, the central axis of the buffer fiber at the extreme end of the buffer fiber is essentially parallel to the dowel pins, and the segment of the buffer fiber that projects from the buffer fiber clip toward the alignment block is smoothly curved. Since the stabilizing assembly 84 is in the stowed position, the wheel 120 does not interfere with positioning of the leading end of the buffer fiber. The clip 30B includes magnetic material and the stage 16B is provided with a permanent magnet (not shown) which holds the clip 30B in position against the shoulders 16T and 16L.

The operator strips an end segment of a test fiber 70T and fits it in the test fiber clip 30T and cleaves the test fiber, as in the case of the buffer fiber, and installs the test fiber clip on the stage 18 by placing the clip against the longitudinal shoulder 18L with the reference face of the clip toward the transverse shoulder 18T. The operator advances the clip 30T horizontally along the longitudinal shoulder to bring the reference face into contact with the transverse shoulder 18T. As the test fiber clip approaches the transverse shoulder, the leading end of the test fiber is guided between the insertion guides into contact with the dowel pins 42 and ultimately reaches a final position such that the end of the test fiber is in contact with the dowel pins 42 and is in the alignment groove 48, the central axis of the test fiber at the extreme end of the test fiber is parallel to the dowel pins, and the segment of the test fiber that projects from the test fiber clip toward the alignment block is smoothly curved. Just as the test fiber clip 30T reaches its final position against the shoulder 18T, it engages the actuator contact wheel 24 and the switch 26 closes.

The length of fiber that projects from each clip is such that during installation of the test fiber clip, the end face of the test fiber contacts the end face of the buffer fiber just before the test fiber clip reaches its final position. Accordingly, when the test fiber clip is in its final position, there is a small degree of "overstuffing" of the fibers between the clips and there is a finite contact force between the end faces of the fibers. The fibers are curved between the clips to a greater degree than would be the case if there were no overstuffing.

The linear actuator 110, the oil dispenser pump 74 and the solenoid valve 64 are all actuated by the controller 28 in accordance with the condition of the switch 26. When the test fiber 70T has been placed in the alignment groove, as detected by closing of the switch 26, the oil dispenser pump 74 ejects a drop of index matching liquid from the dispenser bore 82, which is uphill of the interface between the test fiber and the buffer fiber. The liquid is deflected into the alignment groove 48 by a ridge 130 on the base of the wide channel 36 and flows down the alignment groove, being held between the buffer fiber and the dowel pins 42 by capillary action, and penetrates between the end faces of the buffer fiber and the test fiber and provides a low reflection, low loss optical coupling between the two fibers.

Subsequently, the controller 28 actuates the linear actuator 110 and the wheel 120 rolls back and forth over the fibers several times in order to press the ends of the fibers into the alignment groove so that the ends of the fibers are well seated in the groove and the two ends are accurately aligned. The eight of the wheel 120 and the linkage connecting the wheel to the shaft 86 are sufficient to press the ends of the fibers into the alignment groove. The dumbbell shape of the insertion guides 52 allows the wheel 120 to pass between them. The wheel 120 is moved back and forth several times over the interface between the end faces of the fibers. The final position of the wheel is a home position, in which the wheel is uphill of the interface between the end faces of the fibers and rests on and stabilizes the buffer fiber.

When the wheel 120 is in its final position, the OTDR tests the test fiber by launching optical energy into the test fiber by way of the buffer fiber and measuring the intensity of return optical energy received from the test fiber as a function of time. When the test is completed, the operator removes the test fiber clip to allow another test fiber to be tested. When the test fiber clip is removed, the switch 26 opens. The controller 28 actuates the solenoid valve 64, which connects the collection chamber 60 to the tank 68 and thereby places the collection chamber under suction. Excess index matching liquid and any dirt and debris suspended therein are thereby removed from the alignment groove 48 and the cylindrical pocket 40.

The diameter of the dowel pins 42 and the width of the narrow channel 38 are chosen relative to the diameter of the fiber to be tested and the specified tolerance in diameter of the fiber so that if the test fiber and buffer fiber differ in diameter by no more than the specified tolerance, and the two ends of the fibers are seated in the alignment groove, the two fibers will not be laterally offset from one another to an extent such as to interfere with their being optically coupled.

By virtue of the orientation of the stage 18, the test fiber clip is installed by a horizontal movement. This action is generally considered easier for an operator than moving the test fiber clip along an inclined path, e.g. at 24° to horizontal.

It has been found by use of the fiber aligner shown in FIGS. 1–8, that the action of the rotatable wheel results in a high probability of successful alignment of the test fiber with the buffer fiber. This has been verified by measuring the quality of coupling between the fibers before and after running of the wheel. Further, by returning the wheel to its home position after running the wheel over the junction between the fibers, the weight of the wheel and its linkage tends to hold the buffer fiber in position so that there is no danger of its springing from the alignment groove when the test fiber is removed or a new test fiber is installed. Moreover, the friction between the buffer fiber and the dowel pins due to the weight of the wheel resting on the buffer fiber is sufficient to prevent movement of the buffer fiber along the alignment groove when the test fiber is removed or a new test fiber is installed. Therefore, the position of the end face of the buffer fiber does not change as successive test fibers are installed and removed and the position of the interface between the buffer fiber and the test fiber remains consistent during a test and from test to test. This ensures that the optical character of the interface does not change during a test due to change in position of the end face of the buffer fiber. The stability in position of the interface also ensures that the geometry of the test fiber or the buffer fiber does not change during a test or from test to test in a manner such as to affect the measurement results. Since the end face of the buffer fiber is held firmly against movement when it is engaged by the end face of the test fiber, the overstuffing of the test fiber ensures that there is sufficient friction between the end faces of the two fibers that there is no transverse relative movement of the end faces of the fibers during a test.

When a test fiber is inserted in the alignment groove, an end segment of the fiber scrapes against the dowel pins and dirt and debris are removed from the test fiber. Because the alignment groove 48 between the dowel pins is open at the bottom, small particles of dirt and debris pass with the index matching liquid between the dowel pins into the bottom of the narrow channel 38 and are carried with the index matching liquid, flowing under gravity, into the collection chamber 60, either through the bores 56 or by way of the collecting pocket 40 and the bore 58. Larger particles, which cannot pass between the dowel pins, are carried with the index matching liquid into the collecting pocket 40. Small and large particles are removed with the index matching liquid when the collection chamber is placed under suction. By using the index matching liquid to prevent accumulation of dirt and debris in the alignment groove, the probability of a poor coupling due to a particle being trapped between the end faces of the fibers is reduced. Because the buffer fiber extends uphill from the end face, there is a natural tendency for the index matching liquid to flow away from the buffer fiber and carry dirt and debris away from the buffer fiber.

In use of the insertion guides 52, there is a possibility that the end of a fiber will not properly enter the alignment groove 48, in which the wheel rolls back and forth over the interface between the test fiber and the buffer fiber but will be deflected away from the alignment groove 48 by the curved surface of one of the dowel pins.

Figure 10:
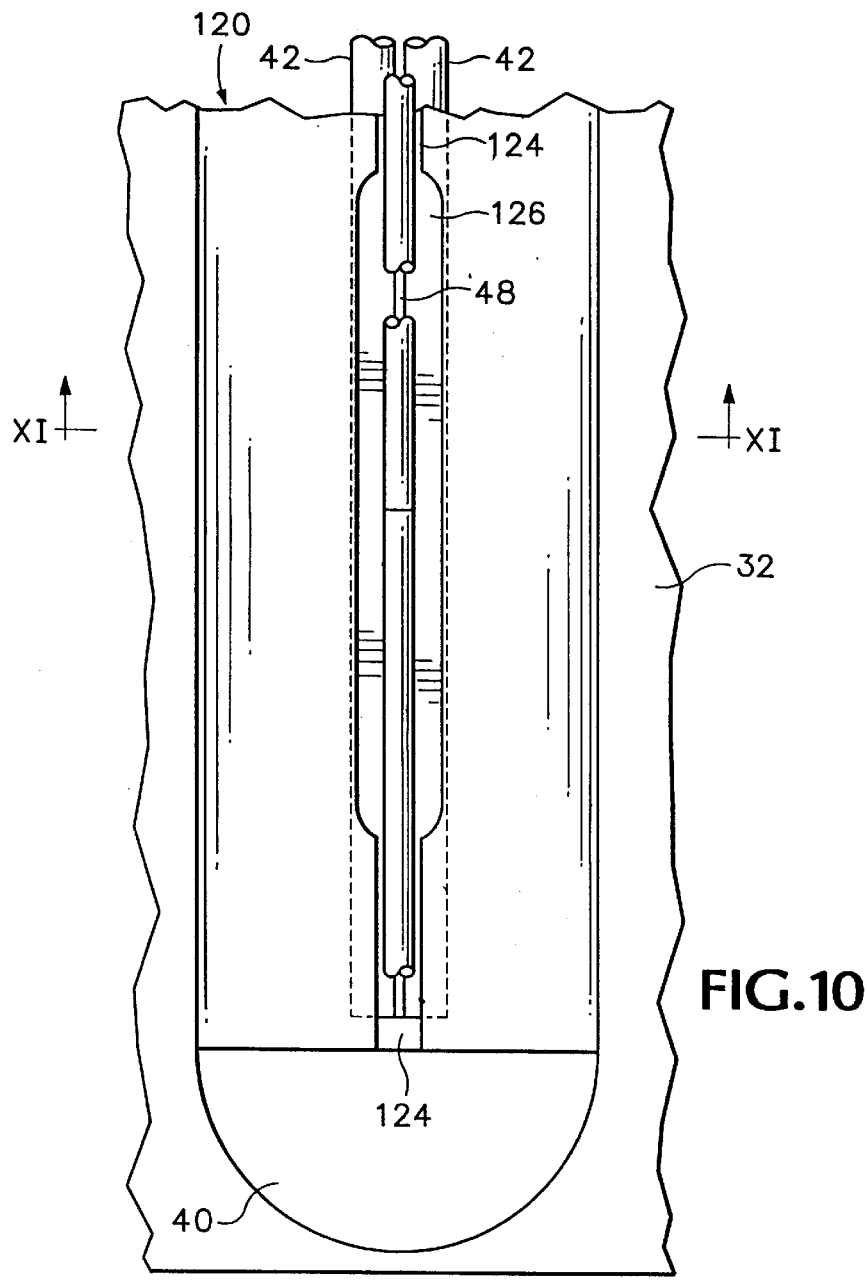
FIG. 10 is a partial view from above of a modified form of the alignment block.
Figure 11:
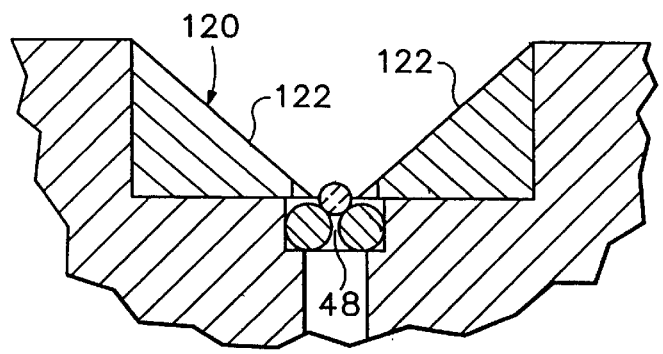
FIG. 11 is a sectional view on the line XI—XI of FIG. 10.

In a modification shown in FIGS. 10 and 11, the insertion guides 52 are replaced with a dual guide wedge 120. The guide wedge has guide surfaces 122 which converge toward a slot which has two narrow end regions 124 and a wide medial region 126. The guide wedge is dimensioned and positioned so that when the buffer fiber or test fiber is installed, the end of the fiber enters the guide at the level of one of the narrow end regions of the slot. The sloping sides of the guide wedge guide the end of the fiber into the narrow end region of the slot, and the end of the fiber is received in the alignment groove 48 between the steel dowel pins 42 without any danger that it will be deflected out of the alignment groove by the curved surface of one of the dowel pins.

It will be appreciated that the invention is not restricted to the particular embodiment that has been described, and that variations may be made therein without departing from the scope of the invention as defined in the appended claims and equivalents thereof. For example, a sliding element may be used instead of the rolling wheel to seat the fibers in the alignment groove. However, a rolling wheel is preferred because it eliminates any tendency for the seating element to wear due to abrasion by the fiber. The seating element need not be supported by a linkage similar to that shown in the drawings, and it may instead be spring biased toward the alignment groove such that when the test fiber is pushed toward the buffer fiber, it pushes the seating element upward against the bias force. Moreover, the invention is not limited to a fiber aligner in which fibers are introduced manually into the alignment zone but it may also be applied to a fiber aligner in which the fibers are introduced into the alignment zone using an automatic mechanism.

We claim:

1. An aligner for bringing two slender elongate members into accurate end-to-end alignment, comprising:
    an alignment member formed with an alignment channel,
    first and second rods fitted in the alignment channel, and
    a means for holding the rods in spaced apart relationship in the alignment channel whereby an open bottom groove is formed between the rods for receiving the elongate members, the rods being at a substantially uniform spacing over their length and the space between the rods being sufficiently wide to allow dirt and debris from the elongate members to pass between the rods but not so wide as to allow the elongate members to pass between the rods.

2. An aligner for bringing two slender elongate members into accurate end-to-end alignment, comprising:
    an alignment member which is made of a non-magnetic material and is formed with an alignment channel,
    first and second rods made of a magnetic material and fitted in the alignment channel, and
    a permanent magnet means for holding the rods in spaced apart relationship in the alignment channel whereby an open bottom groove is formed between the rods for receiving the elongate members, the space between the rods being sufficiently wide to allow dirt and debris from the elongate members to pass between the rods but not so wide as to allow the elongate members to pass between the rods.

3. An aligner according to claim 2, wherein the permanent magnet means includes first and second magnets at opposite respective sides of the alignment channel and oriented with like poles toward the channel.

4. An aligner according to claim 2, wherein the permanent magnet means comprises first and second sets of three permanent magnets, the first and second sets being at opposite respective sides of the channel with each magnet of the first set aligned across the channel with a corresponding magnet of the second set, and wherein the polarization of the three magnets in each set alternates along the channel.

5. An aligner for bringing two slender elongate members into accurate end-to-end alignment, comprising:
    an alignment member formed with an alignment channel,
    first and second rods fitted in the alignment channel, and
    a means for holding the rods in spaced apart relationship in the alignment channel whereby an open bottom groove is formed between the rods for receiving the elongate members, the space between the rods being sufficiently wide to allow dirt and debris from the elongate members to pass between the rods but not so wide as to allow the elongate members to pass between the rods, and
    a means for presenting the elongate members to the groove at opposite ends thereof and advancing the elongate members toward each other along the groove, wherein the presenting means includes first and second stages each including a guide member defining an axis of advancement of an elongate member toward the alignment member and the two axes of advancement defined by the guide members of the first and second stages respectively are mutually inclined and the groove lies on an axis which is equally inclined to the two axes of advancement.

6. An aligner for bringing two optical fibers into accurate end-to-end alignment, comprising:
    a base defining a reference plane, said reference plane being horizontal when the aligner is in use,
    an alignment member mounted on the base and formed with an alignment channel inclined at an angle of at least about 20° relative to the reference plane for receiving respective end segments of the optical fibers, and
    a dispenser for dispensing index matching liquid into the channel at an uphill location of the channel so that loose matter in the channel is carried downhill with the liquid.

7. An aligner according to claim 6, wherein the alignment channel is formed with bores passing downward from the alignment channel and the aligner includes a suction means for applying suction to the bores and removing liquid from the bores.

8. An aligner according to claim 7, comprising first and second rods fitted in the alignment channel and a means for holding the rods in spaced apart relationship in the alignment channel.

9. An aligner according to claim 6, wherein the alignment member is formed with a receiving pocket at a downhill end of the alignment channel.

10. An aligner according to claim 9, wherein the alignment member is formed with a bore extending downward from the receiving pocket and the aligner further comprises a suction means connected to the bore for removing liquid from the receiving pocket.

11. An aligner according to claim 8, comprising a seating member for seating the ends of the optical fibers in the groove.

12. An aligner according to claim 11, wherein the seating member comprises a wheel and a mechanism for rolling the wheel along the groove in reciprocating fashion.

13. A method of testing a length of optical fiber, comprising:

(a) providing a fiber aligner comprising a base defining a reference plane, said reference plane being horizontal when the aligner is in use, an alignment member mounted on the base and formed with an alignment channel inclined at an angle of at least about 20° relative to the reference plane for receiving respective end segments of the optical fibers, and a dispenser for dispensing index matching liquid into the channel at an uphill location of the channel so that loose matter in the channel is carried downhill with the liquid, (b) providing an optical fiber test instrument, (c) coupling the optical fiber test instrument to one end of a buffer fiber, (d) installing the opposite end of the buffer fiber in the fiber aligner and installing one end of the length of fiber to be tested in the fiber aligner, and (e) employing the optical fiber test instrument to launch optical energy into the fiber under test by way of the buffer fiber.

14. A method according to claim 13, further comprising, between step (d) and step (e), supplying index matching liquid to the channel.

15. A method according to claim 14, further comprising, after step (e), employing suction to remove index matching liquid from the alignment channel.

16. A method according to claim 13, comprising, between steps (d) and (e), seating said opposite end of the buffer fiber and said one end of the fiber under test in the channel.

17. A method according to claim 13, wherein the optical fiber test instrument is an optical time domain reflectometer (OTDR) and the method further comprises:

(f) employing the OTDR to measure intensity of optical energy returned to the OTDR from the fiber under test.

18. An aligner for bringing two slender elongate members into accurate end-to-end alignment, comprising:

an alignment member formed with an alignment channel, first and second rods fitted in the alignment channel, and a means for holding the rods in spaced apart relationship in the alignment channel whereby an open bottom groove is formed between the rods for receiving the elongate members, the space between the rods being sufficiently wide to allow dirt and debris from the elongate members to pass between the rods but not so wide as to allow the elongate members to pass between the rods, and a means for presenting a first of the two elongate members to the groove at a first end thereof and advancing the first elongate member toward the second of the two elongate members along the groove, and wherein the presenting means includes a stage having a guide defining an axis of advancement of the first elongate member toward the alignment member and the axis of advancement defined by the guide is inclined relative to the groove at an acute angle.

* * * * *